United States Patent [19]

Arndt

[11] Patent Number: 5,542,160
[45] Date of Patent: Aug. 6, 1996

[54] ATTACHMENT ELEMENT FOR THE ATTACHMENT OF STRAPS, BELTS OR LOOP ON EDGES OF FLAT PIECES OF MATERIAL

[75] Inventor: Johannes Arndt, Wuppertal, Germany

[73] Assignee: Frank Innovation GmbH, Mettmann, Germany

[21] Appl. No.: 198,586

[22] Filed: Feb. 18, 1994

[30] Foreign Application Priority Data

Feb. 19, 1993 [DE] Germany ............ 9302461 U
May 25, 1993 [DE] Germany ............ 9307904 U

[51] Int. Cl.⁶ .................................................. A44B 21/00
[52] U.S. Cl. .................... 24/543; 24/265 R; 24/265 BC; 24/265 EC
[58] Field of Search ................ 24/707.7, 265 A, 24/265 BC, 265 AL, 265 EC, 265 R, 715.1, 714.6, 453, 543, 555, 563, 265 EE

[56] References Cited

U.S. PATENT DOCUMENTS

| | | | |
|---|---|---|---|
| 3,162,920 | 12/1964 | Durham | 24/265 R |
| 3,317,968 | 5/1967 | Plastock | 24/543 X |
| 3,369,279 | 2/1968 | Erteszek | |
| 3,524,230 | 8/1970 | Hankel | 24/707.7 |
| 3,551,965 | 1/1971 | Gordon | 24/543 |
| 3,729,780 | 5/1973 | White | |
| 3,852,855 | 12/1974 | Bengtsson | 24/265 EE |
| 4,378,617 | 4/1983 | Burns | 248/74.3 X |
| 4,387,490 | 6/1983 | Blackburn et al. | 24/265 AX |
| 4,392,283 | 7/1983 | Timmons | 24/543 |
| 4,536,924 | 8/1985 | Willoughby | |
| 4,589,171 | 5/1986 | McGill | |
| 5,103,538 | 4/1992 | Ryder | 24/453 X |
| 5,329,728 | 7/1994 | Ray | 24/555 X |

FOREIGN PATENT DOCUMENTS

| | | |
|---|---|---|
| 1101317 | 3/1961 | Germany |
| 1502332 | 3/1978 | Germany |
| 334763 | 9/1930 | United Kingdom |

*Primary Examiner*—James R. Brittain
*Attorney, Agent, or Firm*—Jacobson, Price, Holman & Stern, PLLC

[57] ABSTRACT

An attachment element is made up of a middle part and two lateral movable parts linked to this middle part. In the middle part, a slot-like recess is provided in order to receive a belt, strap or loop. Using the lateral parts it is then possible for the attachment element to be connected with the flat piece of material. In this respect the middle part is arranged parallel to the edge of the flat piece of material, whereas the two lateral parts fit respectively around the flat piece of material, such as sheeting laying on opposite sides of the flat piece of material. The attachment element is able to be attached adjacent to the flat piece of material in different ways.

8 Claims, 4 Drawing Sheets

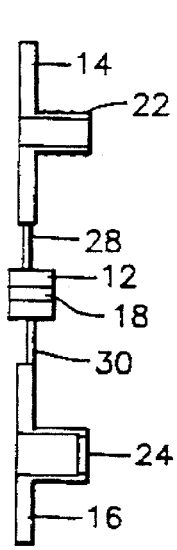 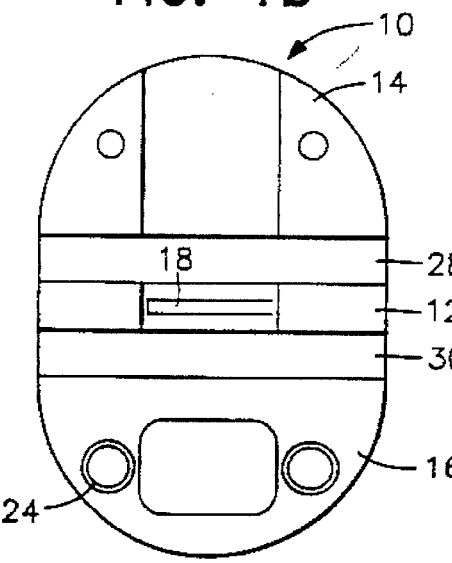 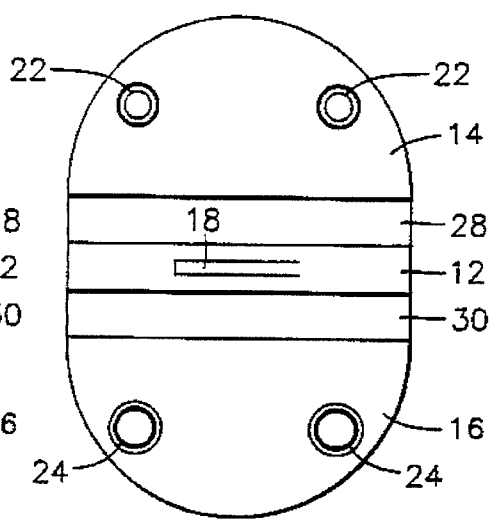
FIG. 1a   FIG. 1b   FIG. 1c
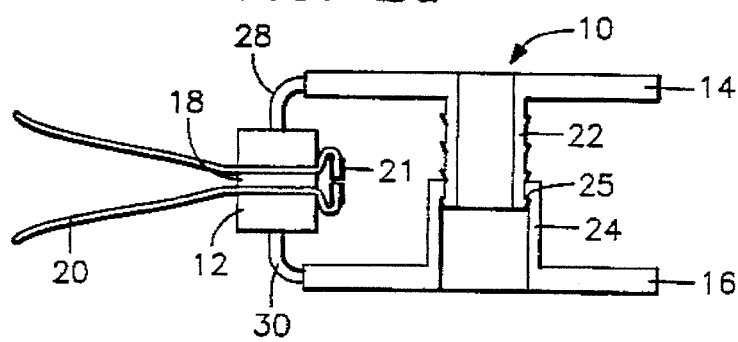
FIG. 2a
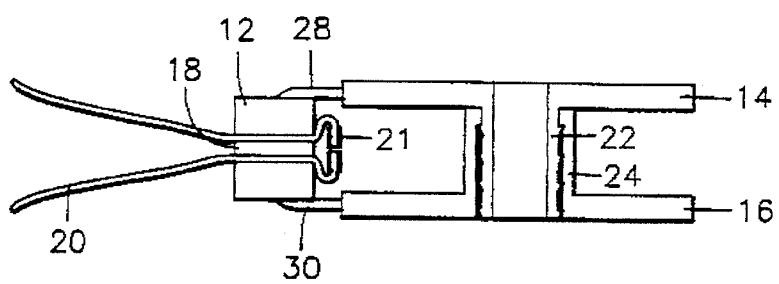
FIG. 2b

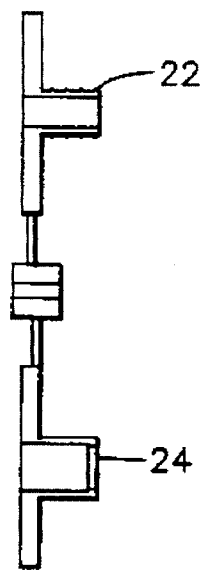
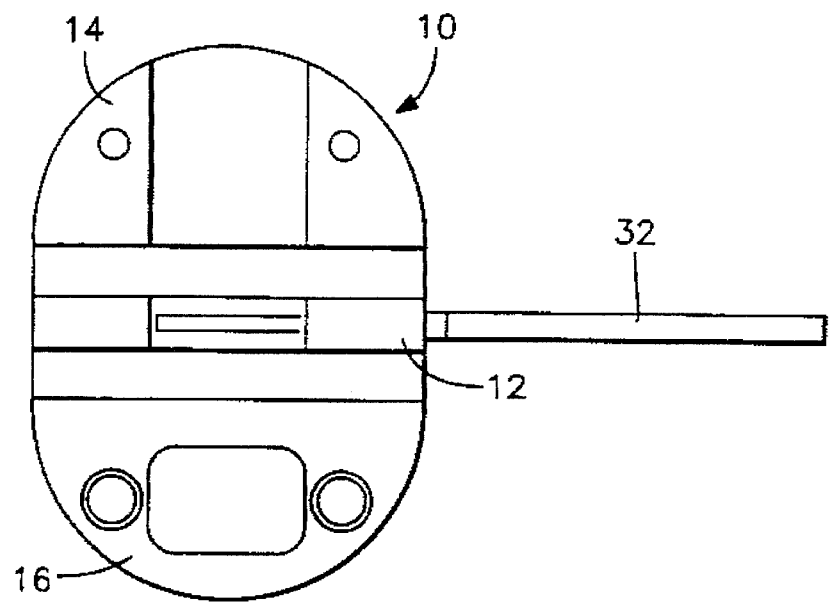
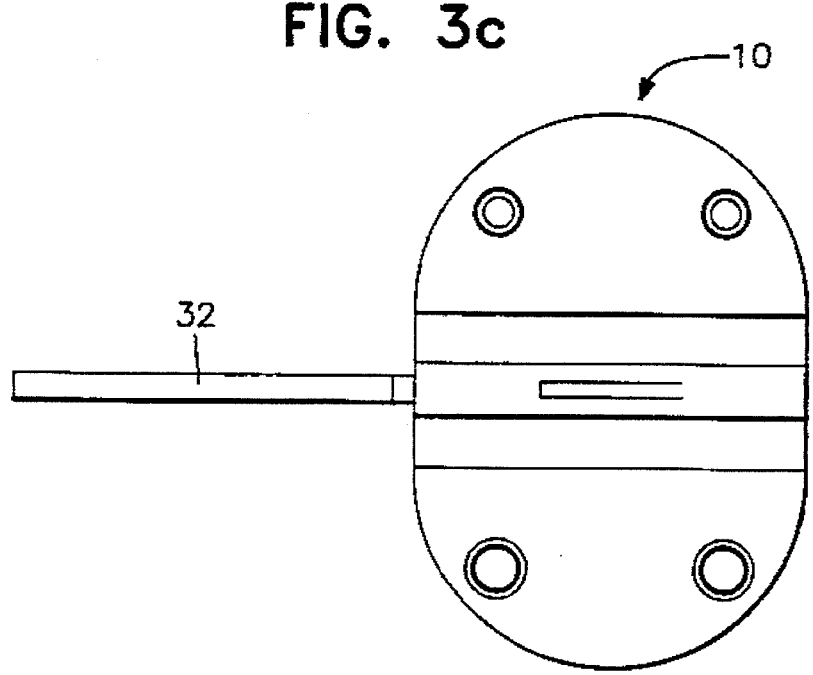

5,542,160

ATTACHMENT ELEMENT FOR THE ATTACHMENT OF STRAPS, BELTS OR LOOP ON EDGES OF FLAT PIECES OF MATERIAL

FIELD OF THE INVENTION

The invention relates to an attachment element consisting of plastic for the attachment of straps, belts or loops on edges of flat pieces of material and more particularly, attachment on insulating camping mats, exercise mats or bed rolls.

BACKGROUND OF THE INVENTION

As a rule the sheeting of a camping mat consists of foam insulating material. For carrying from place to place, the camping mat is generally rolled up and conventionally tied up with belts which are more particularly made of flexible and stretchable material. In this respect the squeezing force applied by the flexible belts may cause denting or even permanent damage to the rolled up camping mat where the force is applied thereto, such denting thereby impairing the appearance or even the function of the camping mat.

SUMMARY OF THE INVENTION

One object of the invention is therefore to provide an attachment element with which straps, belts or loops may be easily attached to the edges of flat pieces of material, as for example to a camping mat, with simultaneous protection of the edge against damage.

In accordance with the invention, an attachment element which attains this object is made up of a middle part and two lateral movable parts linked to this middle part. In the middle part, a slot-like recess is provided in order to receive the belt, strap or loop. Using the lateral parts it is then possible for the attachment element to be connected with the flat piece of material. In this respect the middle part is arranged parallel to the edge of the flat piece of material, whereas the two lateral parts fit respectively around the flat piece of material, such as sheeting laying on opposite sides of the flat piece of material.

The attachment element is able to be attached adjacent to the flat piece of material in different ways. In accordance with an advantageous embodiment of the invention, at least one detent pin is arranged on one lateral part, with a corresponding hollow cylindrical part arranged on the other lateral part with the detent pin and hollow cylindrical part being lockable together. In accordance with an alternative embodiment of the invention, on the two lateral parts barb elements can be arranged which for example bore into the foam material of a mat and become hooked in position owing to the hooks of the barb elements. As an alternative to this, it is possible for the attachment element to be bonded to the surface of the flat piece of material.

In addition to this it is possible for holding points, as for instance metallic needles to be provided. The lateral parts can be pivotally connected with the middle part using flexible film hinges. This offers the advantage that the attachment element may be employed with flat pieces of material of different thicknesses.

Additionally, it is possible for a rod-like element to be flexibly linked to the middle part. A loop of the belt or strap to be secured may be laid around it. The loop and rod-like element have an increased thickness so that the same loop is no longer able to slip through the slot-like recess in the middle part.

In an alternative design, the middle part is in the form of a rib. To the side of this rib there are then two slot-like recesses so that the belt, the strap or the loop may be slipped through these recesses around the middle part in the form of the rib.

In accordance with a further advantageous form of the invention, the attachment element consists of plastic. Then it may be produced in a simple manner as an injected molded component.

These and other objects of the invention, as well as many of the intended advantages thereof, will become more readily apparent when reference is made to the following description taken in conjunction with the accompanying drawings.

BRIEF DESCRIPTION OF THE DRAWINGS

FIGS. 1a–1c show three views of a first embodiment of the attachment element in accordance with the invention.

FIGS. 2a and 2b are cross-sectional representations of the embodiment in accordance with FIGS. 1a–1c.

FIGS. 3a–3c show three views of a further embodiment of the attachment element in accordance with the invention.

DETAILED DESCRIPTION OF THE PREFERRED EMBODIMENTS

Figure 4A:
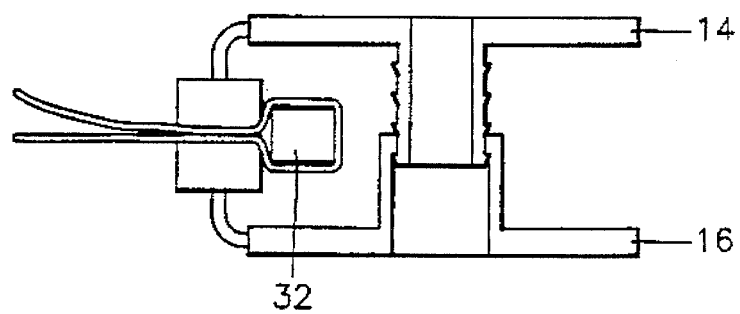
FIGS. 4a and 4b are two sectional views of the embodiment of the invention in accordance with FIGS. 3a–3c.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The attachment element 10 depicted in FIG. 1a–1c possesses a middle part 12, on which lateral parts 14 and 16, respectively, are pivoted by means of film hinges 28 and 30, respectively. In a middle portion 17 of the middle part 12 a slot-like recess 18 is provided. On the lateral part 14 two detent bolts 22 are formed. On the lateral part 16 two corresponding hollow cylinders 24 are formed, which serve to receive the detent bolts 22.

In FIGS. 2a and 2b there is an indication of how projecting teeth 23 arranged in a circular manner on the bolts 22 fit into a projecting edge 25 on the respective hollow cylinder 24. Owing to this arrangement of detent bolts it is possible for the attachment element 10 to be adapted in a very simple fashion to the thickness of different camping mats. As shown in FIGS. 2a and 2b for such adaptation to thickness the provision of flexible film hinges 28 and 30, respectively, is also essential.

In the manner indicated in FIG. 2a, a loop 20 of a flexible and extendable attachment belt is inserted through the slot 18. This loop 20 is prevented from slipping out of the slot 18 since the ends of the belt are sewn together and therefore constitute a thicker part 21.

Figure 4B:
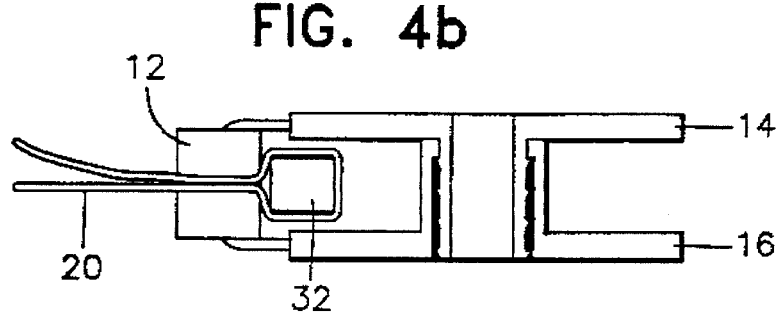

The embodiment of the invention illustrated in FIGS. 3a–3c, 4a and 4b is extremely similar to the embodiment already described. Therefore, like parts are denoted by like reference numerals. In the case of this embodiment there is, however, additionally a further pivotally mounted rod-like element 32, which as shown in FIGS. 4a and 4b, may be threaded through the loop 20 of a corresponding flexible belt. Accordingly, the loop is prevented from slipping through and out of the recess 18.

Figure 5A:
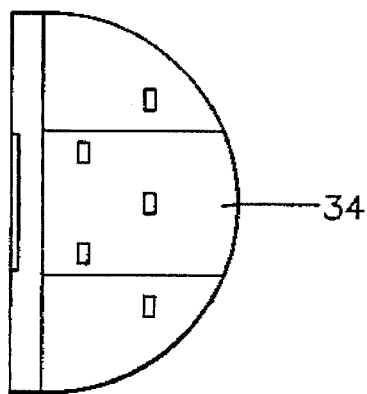
FIGS. 5a–5c a plan view, a front elevation and a section of the third embodiment of the attachment element in accordance with the invention.
Figure 5B:
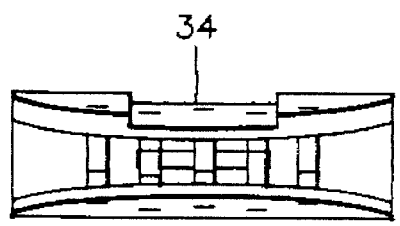
Figure 5C:
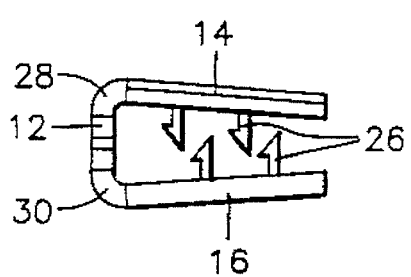

In the embodiment in accordance with FIGS. 5a–5c, the lateral parts 14, 16 are formed with barb elements 26, which for example hook into the foam material of a camping mat and therefore secure the attachment element in place. On the surface of one of the lateral parts it is possible to provide a corresponding recess 34, in which the flexible belt 20 lies in the assembled state of the arrangement.

Figure 6:
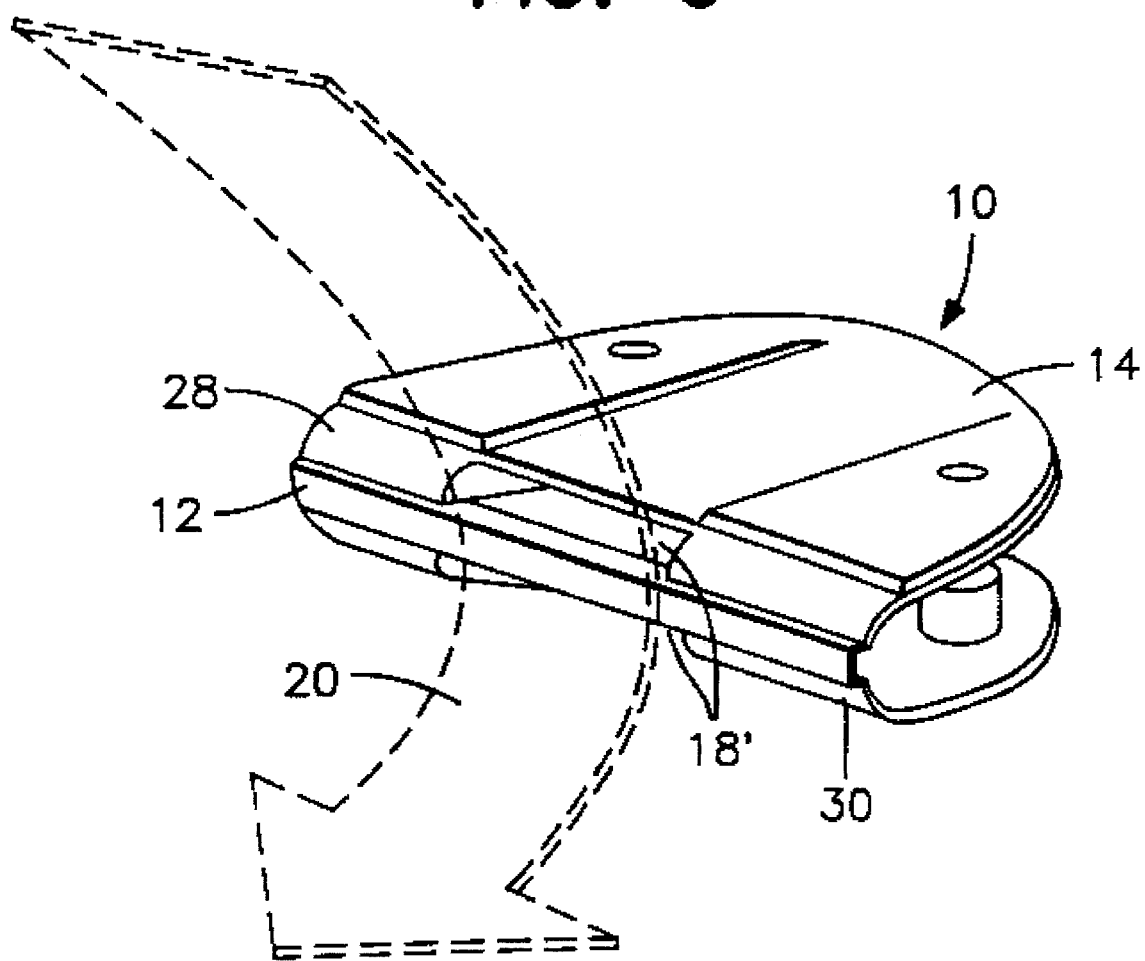
FIG. 6 is a perspective view of an alternative embodiment of the attachment element in accordance with the invention.

FIG. 6 shows an alternative embodiment of the invention, in the case of which the middle part consists of a rib 12, which is adjoined on either side by two slots 18'. Through these two slots 18', the belt 20 is passed, which in this case is indicated by an arrow, as shown in chained lines. The two slots 18' are on one edge defined by the rib 12 and on an opposite edge by the film hinges 28 and 30, as shown in FIG. 6.

Having described the invention, many modifications thereto will become apparent to those skilled in the art to which it pertains without deviation from the spirit of the invention as defined by the scope of the appended claims.

I claim:

1. An attachment element for the attachment of a strap on an edge of a flat piece of material, said attachment element comprising:

a body having a middle part and two lateral parts linked in a movable manner on opposite sides of said middle part, said middle part including means for attaching a strap to said body and having at least a slot-like recess through which opposite ends of said strap extend, said means for attaching includes an element extending laterally from said middle part and being bendable to lie spaced from and parallel to said middle part and between said lateral parts for cooperation with said strap to clench said strap as said strap is pulled through said slot-like recess.

2. An attachment element as claimed in claim 1, wherein said lateral parts are linked with said middle part by flexible film hinges of a lesser width than said middle part and said two lateral parts.

3. An attachment element as claimed in claim 1, wherein on one lateral part at least one detent bolt is arranged for locking engagement with a corresponding hollow cylinder on the other lateral part.

4. An attachment element as claimed in claim 1, wherein the attachment element consists of plastic.

5. An attachment element for the attachment of a strap on an edge of a flat piece of material, said attachment element comprising:

a body having a middle part and two lateral parts linked in a movable manner on opposite sides of said middle part, said middle part including means for attaching a strap to said body and having at least a slot-like recess through which said strap extends, and means for connecting said two lateral parts together and to the flat piece of material, said means for attaching includes an element extending laterally from said middle part and being bendable to lie spaced from and parallel to said middle part and between said two lateral parts for cooperation with said strap to clench said strap as said strap is pulled through said slot-like recess.

6. An attachment element as claimed in claim 5, wherein said slot-like recess lies along a center line of said body.

7. An attachment element as claimed in claim 5, wherein said lateral parts are linked with said middle part by flexible film hinges of a lesser width than said middle part and said two lateral parts.

8. An attachment element as claimed in claim 5, wherein the attachment element consists of plastic.

* * * * *